United States Patent
Weiss

(10) Patent No.: US 9,259,014 B2
(45) Date of Patent: Feb. 16, 2016

(54) FOOD PRODUCTS SERVING AND PRESERVING DEVICE

(75) Inventor: Shahar Weiss, Hodaya (IL)

(73) Assignee: BRINEE HOME SOLUTION LTD., Ashdod (IL)

( * ) Notice: Subject to any disclaimer, the term of this patent is extended or adjusted under 35 U.S.C. 154(b) by 443 days.

(21) Appl. No.: 13/577,229

(22) PCT Filed: Jan. 30, 2011

(86) PCT No.: PCT/IL2011/000102
§ 371 (c)(1),
(2), (4) Date: Aug. 3, 2012

(87) PCT Pub. No.: WO2011/098995
PCT Pub. Date: Aug. 18, 2011

(65) Prior Publication Data
US 2013/0011536 A1     Jan. 10, 2013

Related U.S. Application Data

(60) Provisional application No. 61/303,431, filed on Feb. 11, 2010.

(51) Int. Cl.
*A23B 4/26* (2006.01)
*A23L 3/3454* (2006.01)
*A23B 7/158* (2006.01)
(Continued)

(52) U.S. Cl.
CPC .................. *A23B 7/158* (2013.01); *A23L 1/218* (2013.01); *A47G 19/30* (2013.01)

(58) Field of Classification Search
CPC ......... A23B 7/158; A47G 19/30; A23L 1/218
USPC .............. 220/574.2, 575, 501, 502, 720, 722; 99/495, 646 LS, 412; 285/361, 396, 285/402; 403/349
See application file for complete search history.

(56) References Cited

U.S. PATENT DOCUMENTS 1,336,061 A * 4/1920 Young ........................... 604/199
1,647,039 A * 10/1927 Fischer ....................... 248/309.1
(Continued)

FOREIGN PATENT DOCUMENTS

WO         2011/098995 A1     8/2011

OTHER PUBLICATIONS

International Search Report for International Application No. PCT/IL2011/000102, dated Jun. 10, 2011, 2 pages.

*Primary Examiner* — David Angwin
*Assistant Examiner* — John J Norton
(74) *Attorney, Agent, or Firm* — Novak Druce Connolly Bove + Quigg LLP

(57) ABSTRACT

A device for serving and preserving food items, the device including an open container for holding the food items having one or more side walls and a floor, wherein when the food items are immersed in fluid, typically a preserving fluid, the device is in a preserving state; a liquid-holding compartment, having a tubular form, for holding the fluid when the device is in a serving state; and a liquid-transfer mechanism for transferring the preserving fluid from the open container into the liquid-holding compartment and back. One or more passageways, interconnecting the open container and the liquid-holding compartment, facilitate the transfer of fluid between the open container and the liquid-holding compartment.

15 Claims, 19 Drawing Sheets

(51) Int. Cl.
*A23L 1/218* (2006.01)
*A47G 19/30* (2006.01)

(56) References Cited

U.S. PATENT DOCUMENTS

| | | | | |
|---|---|---|---|---|
| 2,174,329 A * | 9/1939 | O'Neill | ......................... | 141/375 |
| 2,627,857 A * | 2/1953 | Attilio | ......................... | 604/407 |
| 2,904,205 A | 9/1959 | Callery | | |
| 3,249,250 A | 5/1966 | McKee | | |
| 3,380,592 A | 4/1968 | Arnold | | |
| 3,913,770 A | 10/1975 | Tarro | | |
| 4,146,288 A * | 3/1979 | Ramsay et al. | ............... | 439/316 |
| 4,179,040 A | 12/1979 | Bateman | | |
| 4,420,083 A * | 12/1983 | Baustin | ......................... | 206/538 |
| 4,756,638 A * | 7/1988 | Neyret | ......................... | 403/261 |
| 4,815,637 A * | 3/1989 | Nellis | ..................... | 222/402.12 |
| 5,017,171 A * | 5/1991 | Shiina | ......................... | 446/197 |
| 5,082,135 A | 1/1992 | DeCoster | | |
| 5,634,569 A | 6/1997 | DeCoster | | |
| 5,704,659 A * | 1/1998 | Lunder | ......................... | 285/361 |
| 5,752,604 A * | 5/1998 | Hayman | ......................... | 206/534 |
| 5,868,266 A | 2/1999 | Nobakht | | |
| 5,871,116 A | 2/1999 | Picchietti | | |
| 6,561,784 B1 * | 5/2003 | Atwell | ......................... | 425/133.1 |
| D558,532 S | 1/2008 | Peterson | | |
| 7,464,969 B2 * | 12/2008 | Poll | ......................... | 285/242 |
| 7,481,329 B2 * | 1/2009 | Camp, Jr. | ......................... | 220/729 |
| 7,544,294 B2 | 6/2009 | Halterman | | |
| 8,622,317 B1 * | 1/2014 | Anuskiewicz | ................ | 239/205 |
| 2008/0000792 A1 * | 1/2008 | Koch | ......................... | 206/459.5 |
| 2008/0093846 A1 * | 4/2008 | Sparks et al. | ................. | 285/330 |
| 2008/0131567 A1 | 6/2008 | Lemme | | |
| 2008/0149661 A1 | 6/2008 | Sines | | |
| 2008/0257777 A1 * | 10/2008 | Miceli et al. | ................. | 206/534 |
| 2009/0000981 A1 | 1/2009 | So | | |
| 2009/0236258 A1 * | 9/2009 | Connell | ......................... | 206/540 |
| 2009/0283467 A1 * | 11/2009 | Wallerstorfer et al. | ....... | 210/233 |
| 2010/0237079 A1 * | 9/2010 | Sharon et al. | ................. | 220/502 |

* cited by examiner

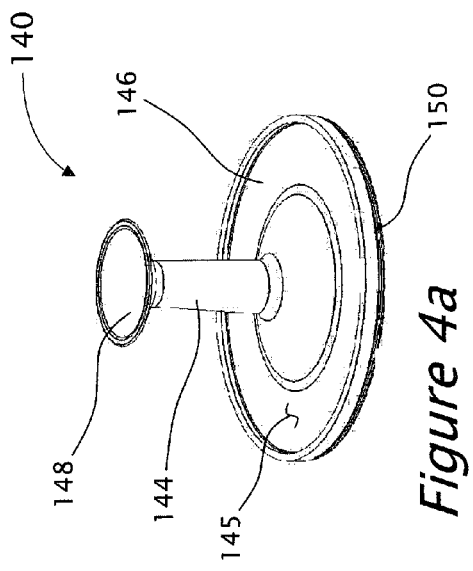
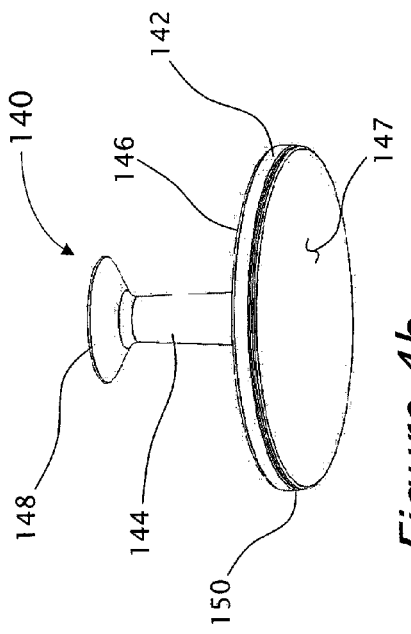
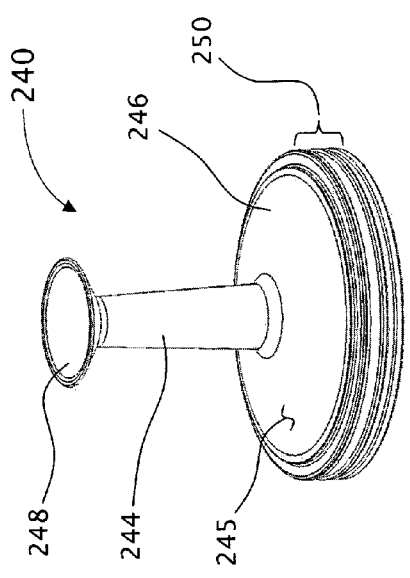
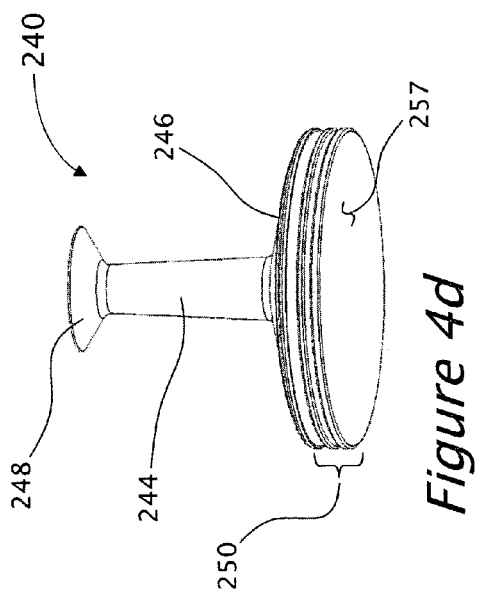
Figure 4a
Figure 4b
Figure 4c
Figure 4d

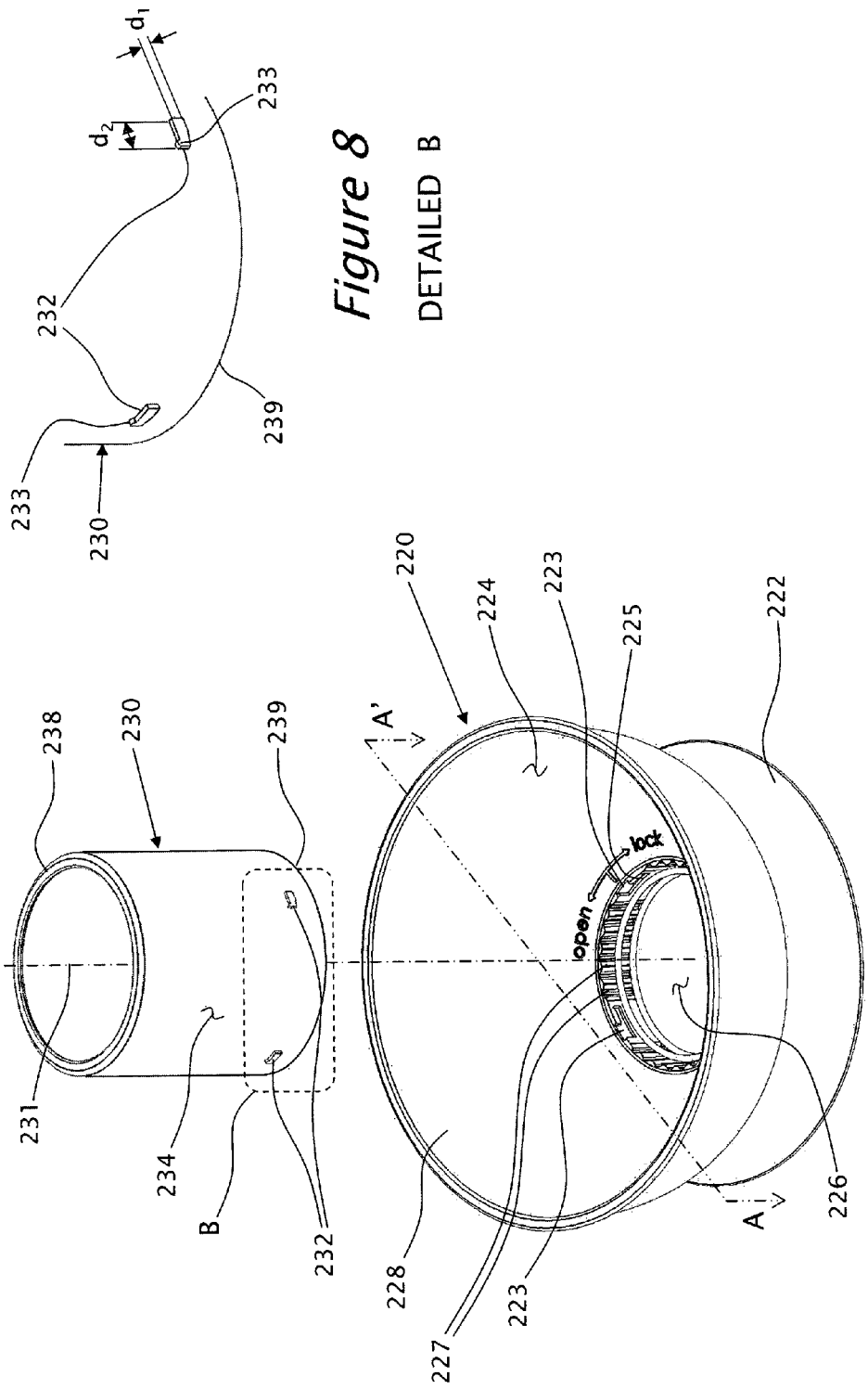

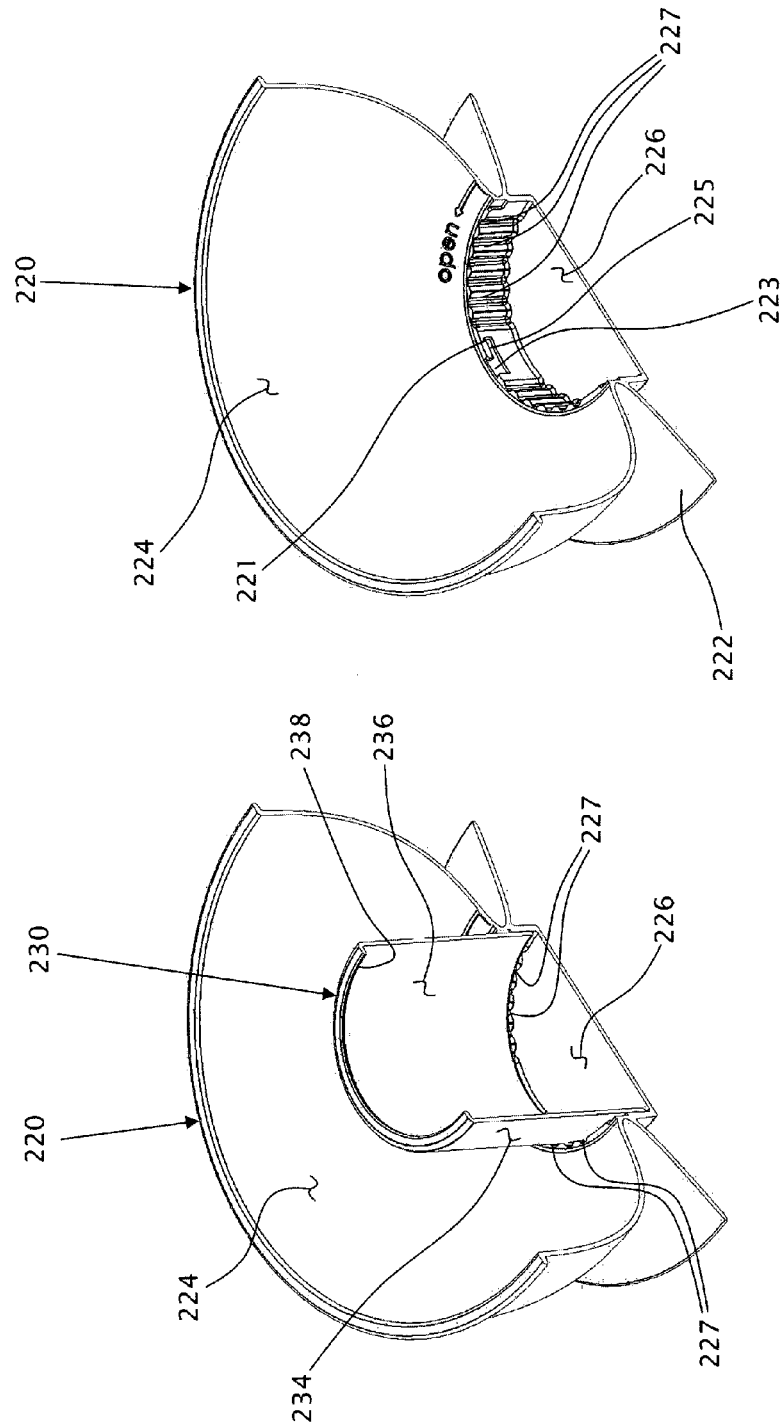

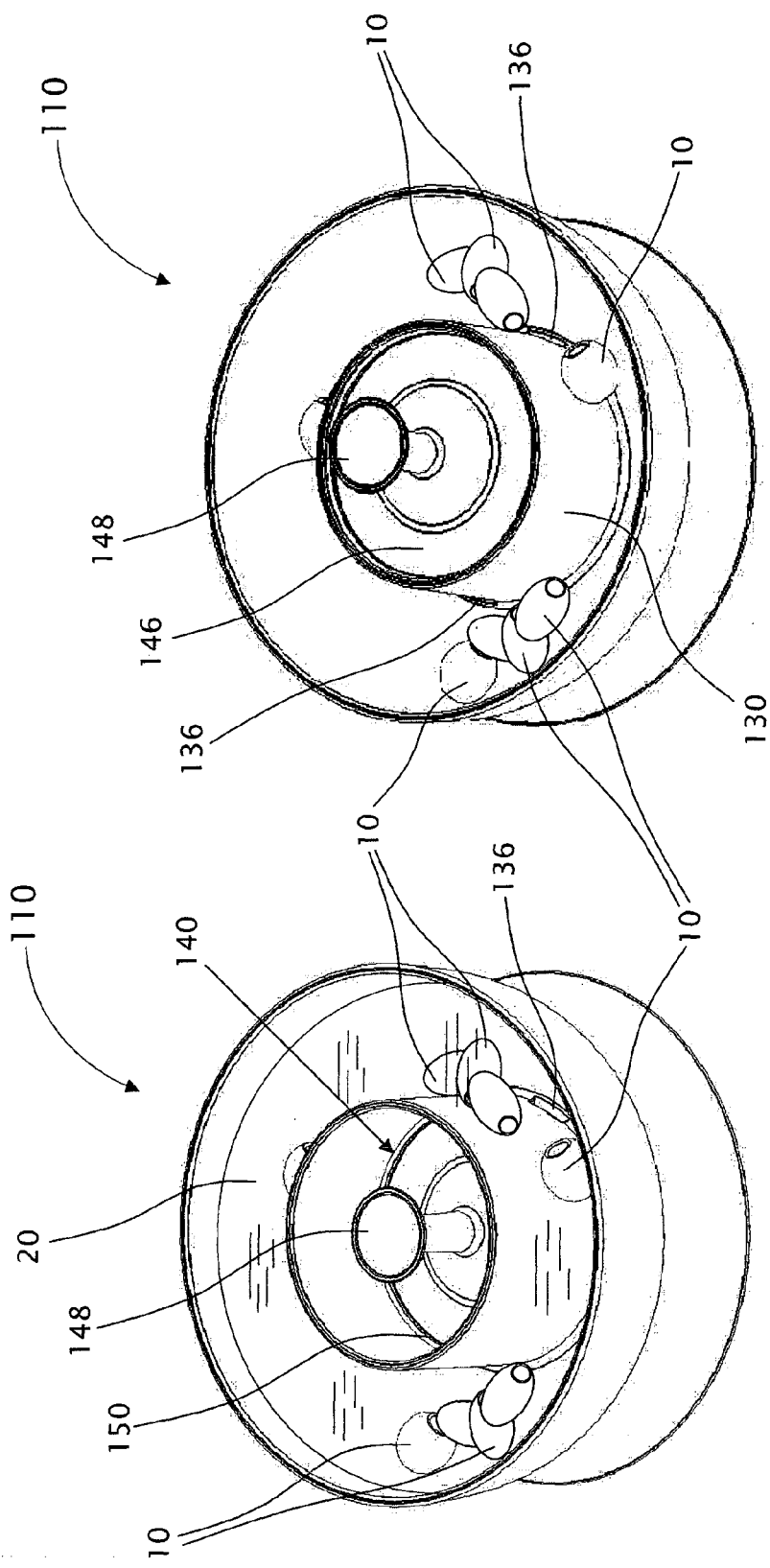

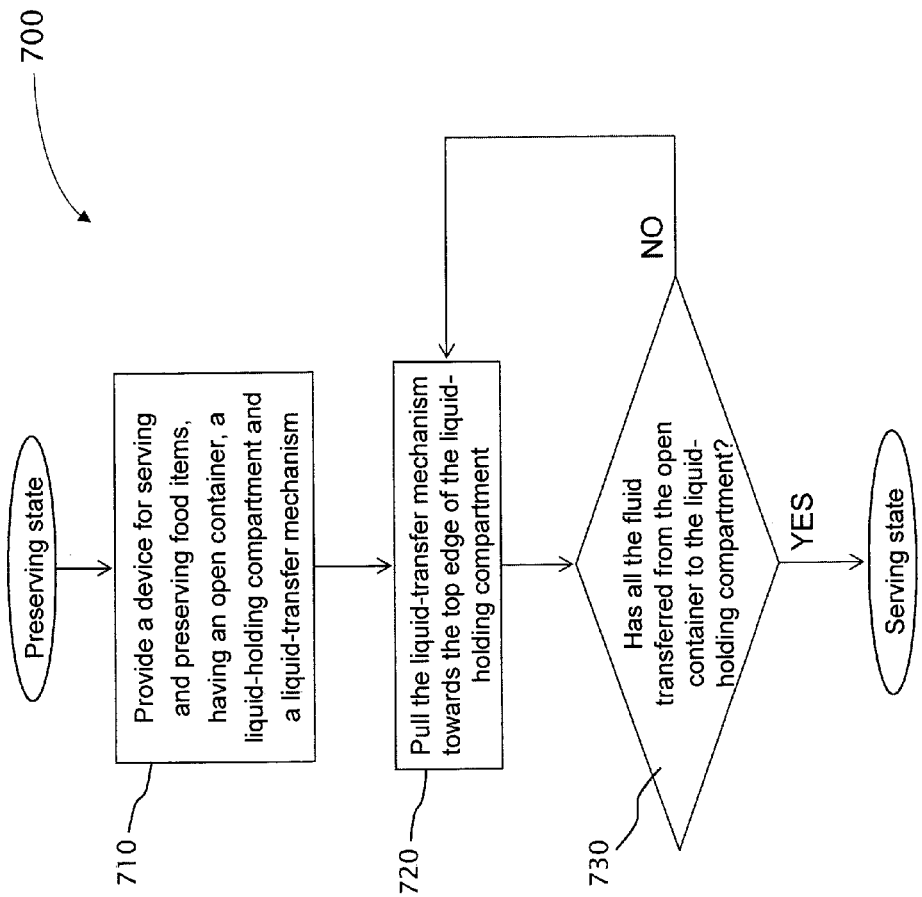

FOOD PRODUCTS SERVING AND PRESERVING DEVICE

CROSS REFERENCE TO RELATED APPLICATIONS

This application claims the benefit under 35 USC 119(e) from U.S. provisional application 61/303,431, filed on Feb. 11, 2010, which is hereby incorporated by reference in its entirety.

FIELD OF THE INVENTION

The present invention relates to devices for serving food items such as olives, pickles and cherries, and more particularly, to a device for serving and preserving food items that are immersed in a preserving liquid such as olives, pickles and cherries. The serving and preserving device includes an open container for holding the food items typically immersed in a preserving fluid (while the food items are in a preserving state), a compartment for holding the preserving fluid (while the food items are in a serving state), and a mechanism for transferring the preserving fluid from the food-items container into the liquid-holding compartment and back.

BACKGROUND OF THE INVENTION

Selected goods, and in particular food items such as olives, pickles and cherries, are stored in a container submerged in brine or another appropriate fluid. Access to the food items is provided through the top of the container and involves "fishing" the individual food items out of the fluid, either manually or utilizing an instrument such as a fork, of which both create various problems (e.g. sanitary and convenience issues).

A common solution to the dispensing of food items from deep liquid-containers has been to provide a vertically-movable insert within the container which elevates the food items to an open upper mouth of the container. Examples of such devices are taught by Callery, in U.S. Pat. No. 2,904,205 (hereinafter Callery '205); by McKee, in U.S. Pat. No. 3,249,250 (hereinafter McKee '250); by Arnold, in U.S. Pat. No. 3,380,592 (hereinafter Arnold '592); and by Bateman et al., in U.S. Pat. No. 4,179,040 (hereinafter Bateman '040). In all embodiments, the movable member can rotate 360° about the retainer, and can be set at any desired angle.

In Bateman '040, the insert has a handle which cooperates with guide means within the container to maintain proper alignment of the tray as the insert is moved. The handle projects above the container for ready access thereto.

The inserts taught in Callery '205, McKee '250, and Arnold '592 have handles at or below the top of the container, and require removal of some of the foodstuff, as suggested in McKee '250, before convenient access to the handle is possible. McKee '250 also includes a sliding lock which is indicated as being slidable along the stem of the lifting device, and hooking over the upper rim of the container to hold the device at any desired location. McKee '250 does not explain how the lock is accommodated within the container when not actually engaged with the rim.

Another solution is taught by Decoster, in U.S. Pat. No. 5,082,135 (hereinafter Decoster '135), which provides another receptacle with vertically-extending internal guide-ribs which terminate in upper support shoulders in a downwardly-spaced relation to the open upper end of the receptacle. An insert is mounted for vertical sliding within the receptacle, and includes a bottom tray having recesses at peripherally-spaced points thereabout, corresponding to the position of the guide ribs. The recesses complement the ribs to enable a vertical non-rotational guiding of the insert. The tray, above the shoulders, rotates to seat on the shoulders.

The term "tubular form" as used herein refers to an object having the form of a tube, shaped like a pipe, hollow, but not necessarily cylindrical.

SUMMARY OF THE INVENTION

The principle intentions of the present invention include providing a device for serving and preserving food items that are immersed in a preserving liquid such as olives, pickles and cherries. The serving and preserving device includes an open container for holding the food items typically immersed in fluid, typically a preserving fluid (while in a preserving state), a liquid-holding compartment for holding the preserving fluid (while in a serving state), and a mechanism for transferring the preserving fluid from the food items container to the liquid-holding compartment and back.

According to the teachings of the present invention, there is provided a device for serving and preserving food items, including an open container, having one or more side walls and a floor, for holding the food items, wherein the device is adapted to be in a preserving state when the food items are immersed in fluid, typically a preserving fluid. The device for serving and preserving food items further includes a liquid-holding compartment, having a tubular form, for holding the fluid when the device is in a serving state, and a liquid-transfer mechanism for transferring the fluid from the open container into the liquid-holding compartment and back. One or more passageways, interconnecting the open container and the liquid-holding compartment, facilitate the transfer of fluid between the open container and the liquid-holding compartment.

Optionally, the device for serving and preserving food items, further includes a lid to enclose the open mouth of the open container, typically, when in preserving state.

Preferably, the liquid-holding compartment shares at least one mutual wall with the open container, wherein the one or more passageways are formed at a preconfigured location in the at least one mutual wall.

The liquid-holding compartment includes an inner wall, an outer wall, a bottom edge disposed adjacent or proximal to the floor of the open container, and a top edge, wherein the one or more passageways are formed at or proximal to the bottom edge. Preferably, the contour of the inner walls of the liquid-holding compartment has a rounded configuration, such as a cylindrical configuration or an elliptical configuration.

The liquid-holding compartment is securely attached to the open container, typically at or proximal to the bottom edge. Preferably, for maintenance purposes, liquid-holding compartment is detachable from the open container, wherein the liquid-holding compartment is operatively attached to the open container by a lock/unlock mechanism.

In embodiments of the present, the lock/unlock mechanism includes one or more dowels, having a width and a height, disposed on the cylindrical external surface of the liquid-holding compartment, at or proximal to the bottom edge; and one or more "L"-shaped grooves formed on the inner walls of a cylindrical cavity, wherein the cylindrical cavity is formed at the bottom of the inner surface of the open container. Each of the "L"-shaped grooves includes an axial section, substantially parallel to the longitudinal axis of the liquid-holding compartment, and a lateral section, substantially perpendicular to the axial section, wherein the number of the "L"-shaped grooves is at least the number of the one or more dowels; the radial distance between adjacent "L"-shaped grooves match the radial distance between adjacent respective dowels; the axial sections of the "L"-shaped grooves are wider than the width of the respective dowels, thereby facilitating the sliding of the dowels inside the axial section of the respective "L"-shaped grooves; and the height of the lateral section of the "L"-shaped grooves is slightly higher than the height of the respective dowels, thereby facilitating the sliding of the dowels inside the lateral section of the respective "L"-shaped grooves.

Preferably, the dowels further include a mobility-limiting projection disposed at a first end of selected dowels, wherein the projection projects toward or away from the bottom edge of the liquid-holding compartment; wherein the lateral sections of the "L"-shaped grooves includes a fitted notch, formed at the closed end of the lateral section, at a location that corresponds to the preconfigured location of the projection; wherein the first end of the selected dowels is the end that is configured to first enter the lateral section of the "L"-shaped grooves; and wherein when in locked state, the projection of the selected dowels is disposed inside a respective fitted notch of the lateral section of the "L"-shaped grooves.

In embodiments of the present, the liquid-transfer mechanism includes a disc member having a top surface, a bottom surface and a peripheral edge; at least one sealing member; and a handle, wherein the handle is securely attached to the top surface of the disc member, for example, by a stem. A peripheral contour of the peripheral edge of the disc member is fitted to the contour of the liquid-holding compartment; and the sealing member is operatively disposed on the peripheral contour of the disc member. Optionally, the at least one sealing member is a sealing ring.

Typically, the liquid-transfer mechanism is operatively disposed inside the liquid-holding compartment, wherein the sealing member substantially seals the top surface of the disc member from the bottom surface of the disc member.

The liquid-transfer mechanism is disposed inside the liquid-holding compartment adjacently to the floor of the open container, when in the preserving state, and thereby the fluid is sustained inside the open container. The liquid-transfer mechanism is disposed inside the liquid-holding compartment adjacently to the top edge of the liquid-holding compartment, when in the serving state, thereby the fluid is sustained inside the liquid-holding compartment.

The liquid-transfer mechanism is pulled up towards the top edge of the liquid-holding compartment and away from the floor of the open container, in order to switch the device from the preserving state to the serving state, thereby forming vacuum inside the liquid-holding compartment, and thereby sucking the fluid from the open container into the liquid-holding compartment, through the one or more passageways.

The transfer mechanism is pushed down towards the floor of the open container, in order to switch the device from the serving state to the preserving state, thereby pushing the fluid from the open container into the liquid-holding compartment, through the one or more passageways.

Optionally, a surge absorber is disposed at or proximal to one or more of the passageways. The surge absorber is adapted to prevent a surge of the liquid from the liquid-holding compartment into the open container.

Optionally, a filter is disposed at or proximal to one or more of the passageways, to thereby prevent debris from entering the liquid-holding compartment. In variations of the present invention the surge absorber is also the filter.

Optionally, the device further including one or more additional open containers, thereby facilitating serving multiple types of food items. Optionally, each of the additional open containers is operatively coupled with a respective liquid-holding compartment. Typically, the additional open containers are operatively coupled with a respective additional liquid-holding compartment.

Optionally, the at least one mutual wall is one or more of the side walls of the open container, wherein the preconfigured location is proximal to the bottom section of the at least one mutual wall.

Optionally, the at least one mutual wall is the floor of the open container, wherein the liquid-holding compartment is expandable in volume. The liquid-holding compartment is substantially minimal in volume when the device is in preserving state, and wherein the liquid-holding compartment is expanded in volume, when the device is in the serving state.

The device is adapted to be placed on a hard surface and the open container the adapted to be pushed down toward the hard surface, in order to switch the device with expendable liquid-holding compartment from the serving state to the preserving state. Whereby, the liquid-holding compartment shrinks in volume and the liquid held inside the liquid-holding compartment flows into the open container through the one or more passageways.

The bottom of the liquid-holding compartment is adapted to be held in place while the open container is pulled away from the bottom of the liquid-holding compartment, in order to switch the device with expendable liquid-holding compartment from the preserving state to the serving state. Whereby, the liquid-holding compartment expands in volume, thereby forming a vacuum inside the liquid-holding compartment, and thereby sucking the fluid from the open container into the liquid-holding compartment through the one or more passageways. Typically, the expandable liquid-holding compartment is the stand of the device.

An aspect of the present invention is to provide a method for switching a device for serving and preserving food items from serving state to preserving state. The method includes the steps of providing the device for serving and preserving food items as described hereinabove, and pushing the handle toward the floor of the open container, thereby transferring the fluid from the liquid-holding compartment to the open container.

Optionally, the device for serving and preserving food items further includes a lid facilitating a fitted enclosing of the an open mouth of the open container, wherein the pushing of the handle towards the floor of the open container is performed with the lid, while enclosing the open mouth of the open container by the lid.

An aspect of the present invention is to provide a method for switching a device for serving and preserving food items from preserving state to serving state, including the steps of providing the device for serving and preserving food items as described hereinabove, and pulling the handle toward the top edge of the liquid-holding compartment and away from the floor of the open container, thereby forming a vacuum inside the liquid-holding compartment, and thereby transferring the fluid from the open container to the liquid-holding compartment.

These and further embodiments will be apparent from the detailed description and examples that follow.

BRIEF DESCRIPTION OF THE DRAWINGS

The present invention will become fully understood from the detailed description given herein below and the accompanying drawings, which are given by way of illustration and example only, and thus not limiting in any way, wherein:

FIG. 4a is a top perspective-view illustration of an exemplary mechanism for transferring the preserving fluid from the food-items container to the liquid-holding compartment and back;

FIG. 4b is a bottom perspective-view illustration of the mechanism for transferring the preserving fluid shown in FIG. 4a;

FIG. 4c is a top perspective-view illustration of another exemplary mechanism for transferring the preserving fluid from the food items container to the liquid-holding compartment and back;

FIG. 4d is a bottom perspective-view illustration of the mechanism for transferring the preserving fluid shown in FIG. 4c;

FIG. 7 is an exploded-view illustration of the food-items container of the serving and preserving device, as shown in FIG. 6;

FIG. 8 is a detailed-view illustration of window B, as shown in FIG. 7;

FIG. 9a is a cross-section. AA'-view illustration of the food-items container of the serving and preserving device, as shown in FIG. 6, having the liquid-holding compartment disassembled;

FIG. 9b is a cross-section AA'-view illustration of the food-items container of the serving and preserving device, as shown in FIG. 6;

FIG. 10 is a top perspective-view illustration of the serving and preserving device shown in FIG. 1, wherein the device is in a preserving state;

FIG. 11 is a top perspective-view illustration of the serving and preserving device shown in FIG. 1, wherein the device is in a serving state;

FIG. 20 is a simplified flowchart of the major operational steps for switching a device for serving and preserving food items from a preserving state to a serving state, according to embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the present invention to those skilled in the art.

Unless otherwise defined, all technical and scientific terms used herein have the same meaning as commonly understood by one of ordinary skill in the art to which the present invention belongs. The methods and examples provided herein are illustrative only, and not intended to be limiting.

Figure 1:
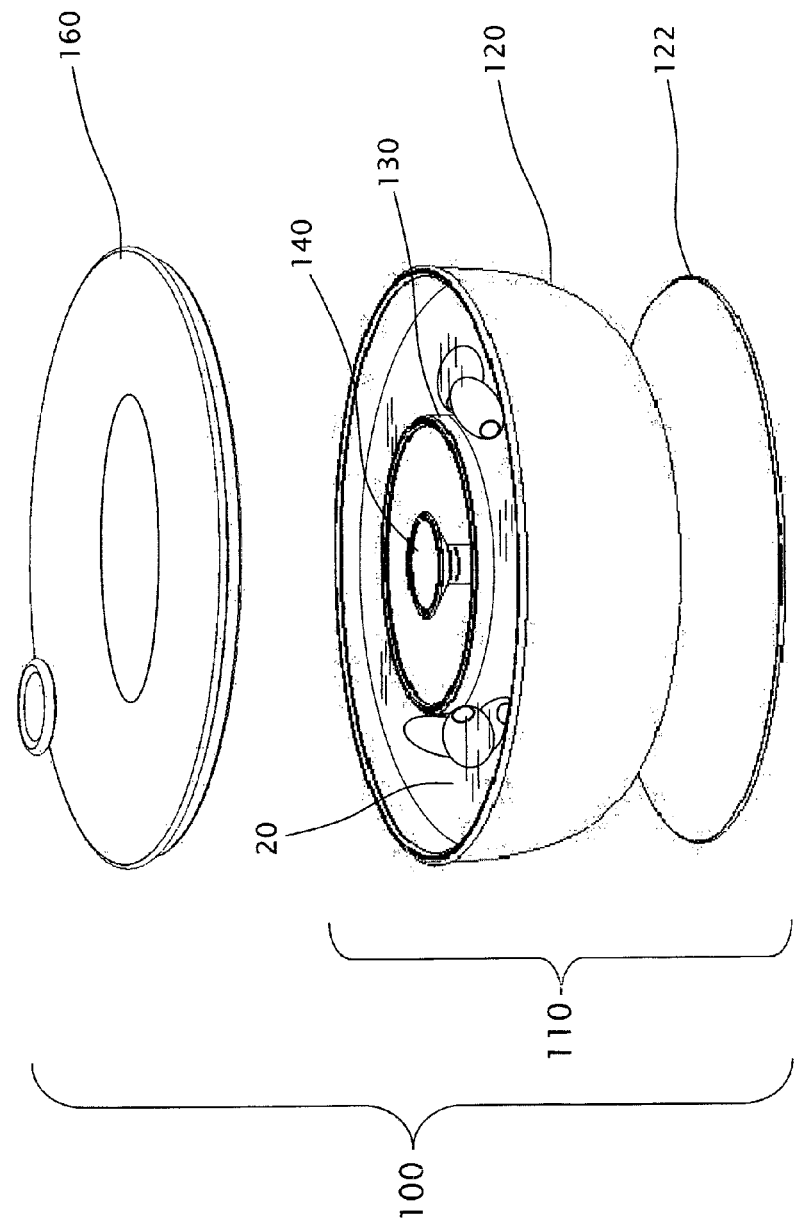
FIG. 1 is a perspective-view illustration of a serving and preserving device, in a partially exploded view, wherein the device is in a preserving state, according to embodiments of the present invention.

Reference is made to the drawings. FIG. 1 is a perspective-view illustration of a serving and preserving device 100 for serving and preserving food items 10 such as olives, pickles and cherries, which are immersed in a preserving liquid 20 when serving and preserving device 100 is in a preserving state, according to embodiments of the present invention. Serving and preserving device 100 includes an open serving container 110 for holding food items 10, wherein food items 10 are typically immersed in preserving fluid 20. Open container 110 includes a dish 120, dish 120 being the food-items container, and preferably a stand 122 for stabilizing serving and preserving device 100. Stand 122 and dish 120 may be made from a single piece or from multiple pieces securely attached to each other.

Serving and preserving device 100 includes a liquid-holding compartment 130 for holding the preserving fluid when serving and preserving device 100 is in a serving state, and a mechanism 140 for transferring fluid 20 from dish 120 to liquid-holding compartment 130 and back.

Optionally, serving and preserving device 100 further includes a lid 160 to enclose the open mouth of dish 120, typically, when in a preserving state. When in use, stand 122 is disposed at the bottom side of serving and preserving device 100, and lid 160 is disposed at the top side of serving and preserving device 100. It should be further noted that top, bottom, and similar notations are used in the context of the devices of the present invention when the stand is standing, for example, on a table.

Figure 2:
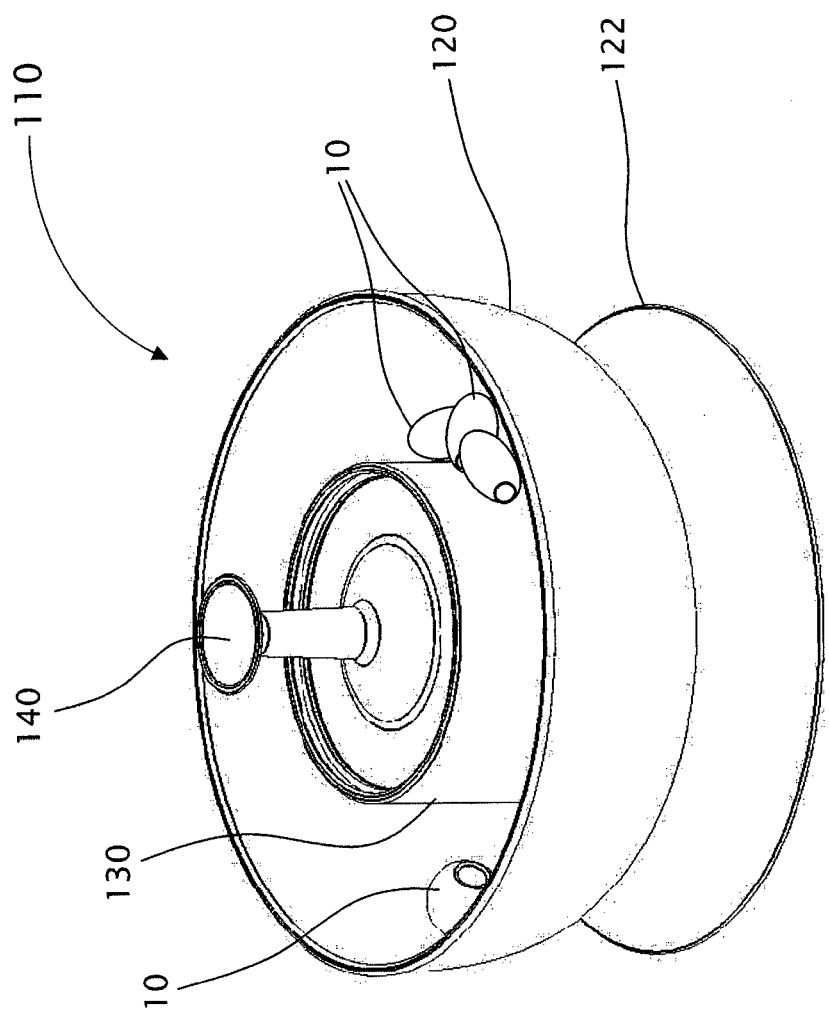
FIG. 2 is a perspective-view illustration of the serving and preserving device shown in FIG. 1, wherein the device is in a serving state.
Figure 3:
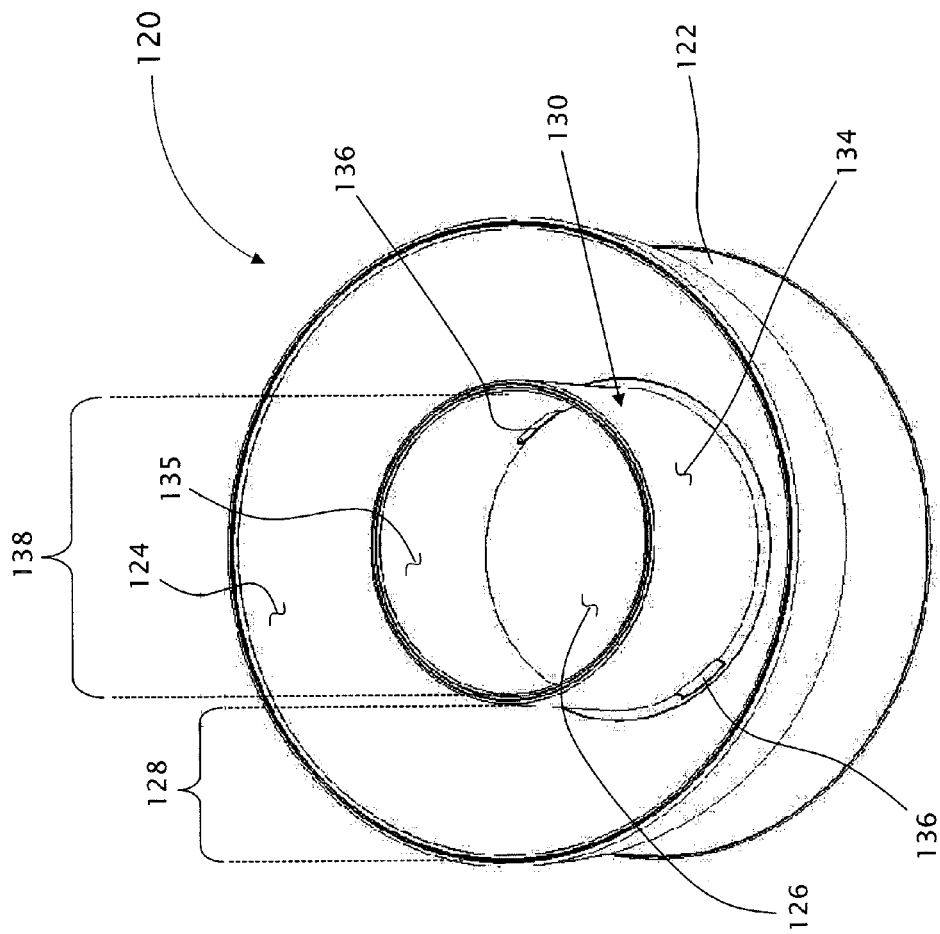
FIG. 3 is a top perspective-view illustration of the serving dish of the serving and preserving device shown in FIG. 1.
Figure 4E:
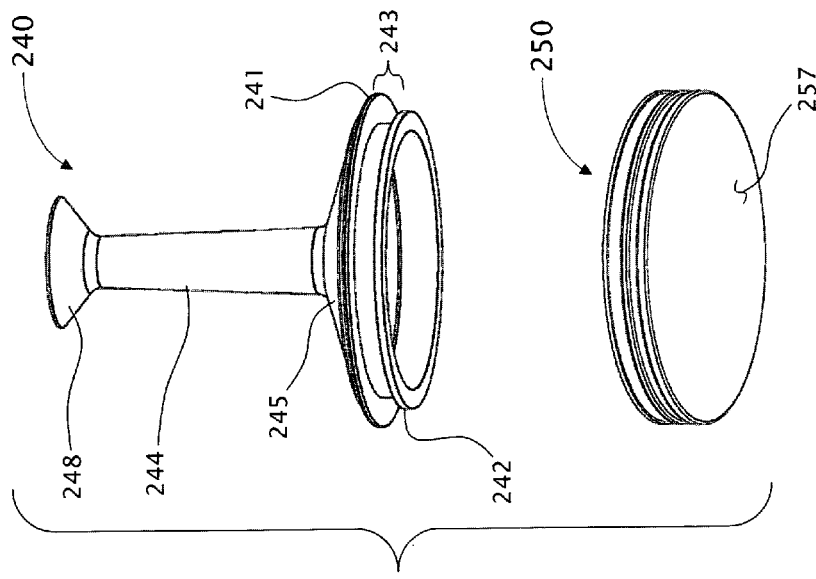
FIG. 4e is a top exploded-view illustration of the mechanism for transferring the preserving fluid shown in FIG. 4c.
Figure 5:
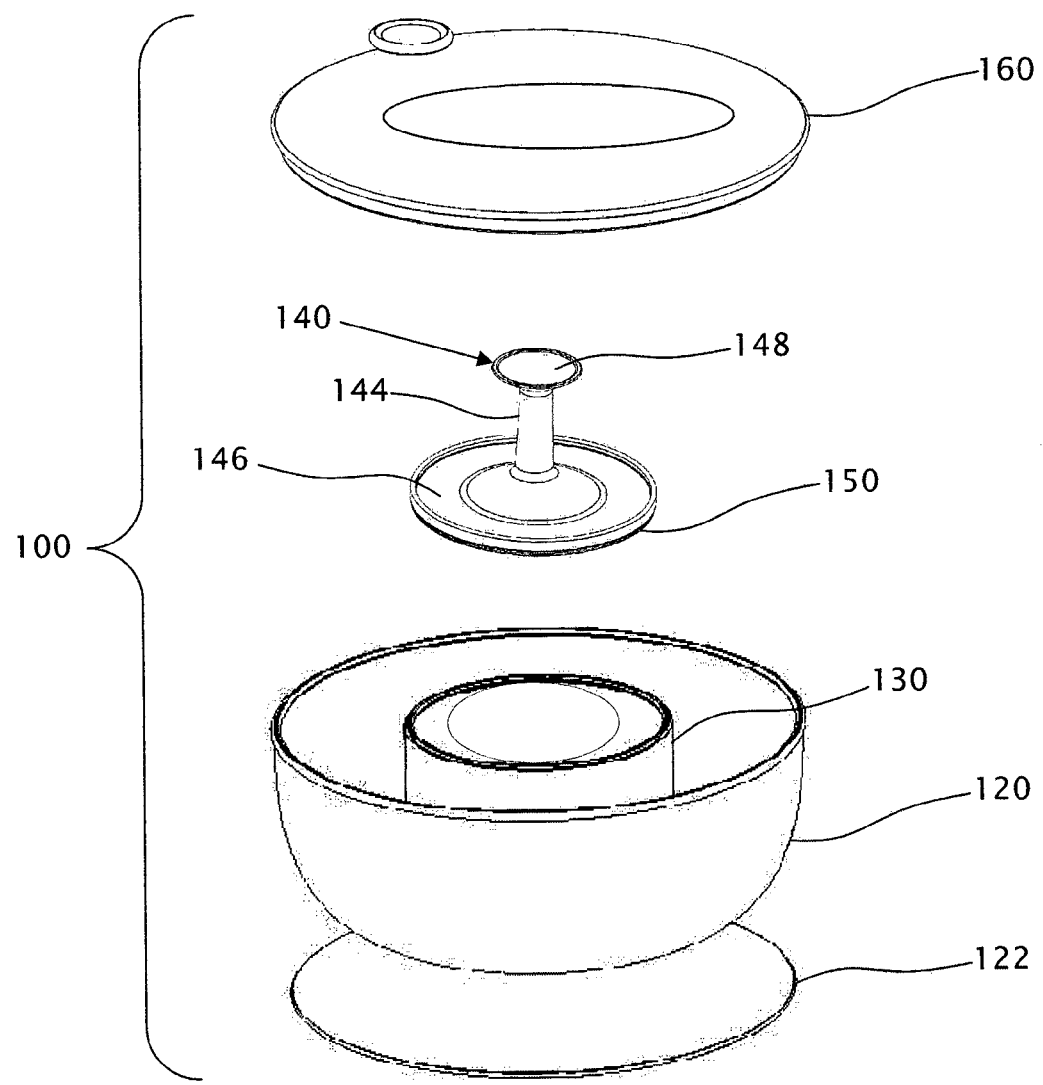
FIG. 5 is an exploded-view illustration of the serving and preserving device shown in FIG. 1.

Reference is also made to FIG. 2, which is a perspective-view illustration of serving and preserving device 100 in a serving state, wherein fluid 20 has been transferred into liquid-holding compartment 130 by mechanism 140, operatively coupled with liquid-holding compartment 130. Reference is also made to FIG. 3, which is a perspective-view illustration of dish 120, and to FIGS. 4a and 4b, which illustrate top and bottom perspective views, respectively, of an exemplary mechanism 140 for transferring fluid 20 from dish 120 to liquid-holding compartment 130 and back. Reference is also made to FIG. 5, which is an exploded view of serving and preserving device 100. Liquid-holding compartment 130, having a tubular form, includes an outer wall 134, an inner wall 135, and one or more openings 136 that facilitate a passage for fluid 20 to flow in and out of liquid-holding compartment 130 from and to the cavity of dish 120. The cavity of dish 120 is formed by a space 128 between an inner wall 124 of dish 120 and an outer wall 134 of liquid-holding compartment 130.

In the example shown in FIGS. 1-12, an inner space 138 of liquid-holding compartment 130 is depicted as cylindrical, formed by an inner wall 135 of liquid-holding compartment 130. It should be noted that in the present invention, liquid-holding compartment 130 is not limited to a cylindrical shape, and can take any shape.

Liquid-transfer mechanism 140 is a piston-type mechanism, including a disc-like-shaped disc member 146, serving as the cylinder for the piston-type liquid-transfer mechanism 140, wherein the peripheral edge of disc member 146 is fitted to the shape and dimensions of inner wall 135 of liquid-holding compartment 130. It should be noted that liquid-transfer mechanism 140 being operatively coupled with liquid-holding compartment 130, is given by way of example only, and other liquid-transfer mechanisms can be used.

Liquid-transfer mechanism 140 further included a handle 148 securely attached to a top surface 145 of disc member 146 by a stem 144, for example. It should be noted that top surface 145 of disc member 146 may not be flat. A bottom surface 147 of disc member 146 is preferably fitted to the coupled section of a floor 126 of dish 120. Typically, bottom surface 147 is, with no limitation, substantially flat. Preferably, liquid-transfer mechanism 140 further included one or more sealing members 150 disposed on an edge 142 formed between bottom surface 147 and top surface 145. Sealing members 150 keep bottom surface 147 of disc member 146 sealed with respect to top surface 145 of disc member 146, while facilitating free up and down motion of liquid-transfer mechanism 140, along inner wall 135 of liquid-holding compartment 130.

Figure 4F:
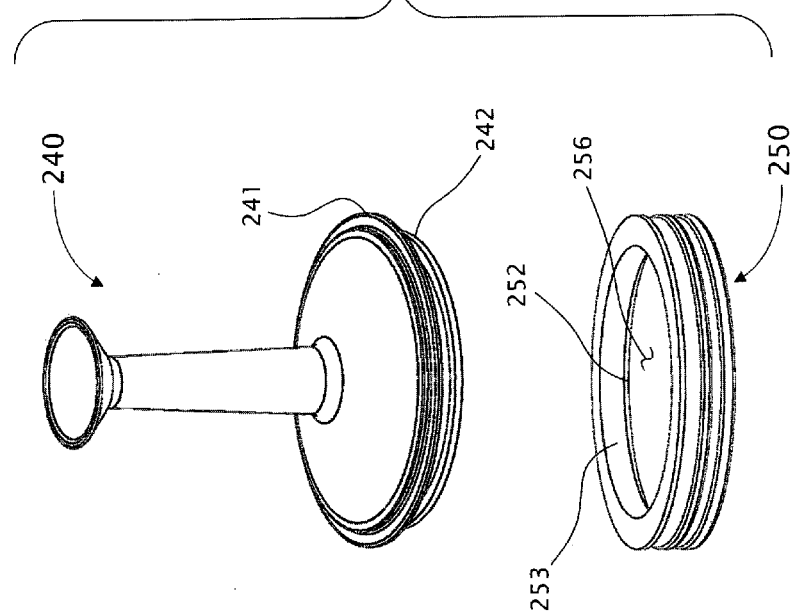
FIG. 4f is a bottom exploded-view illustration of the mechanism for transferring the preserving fluid shown in FIG. 4c.
Figure 4G:
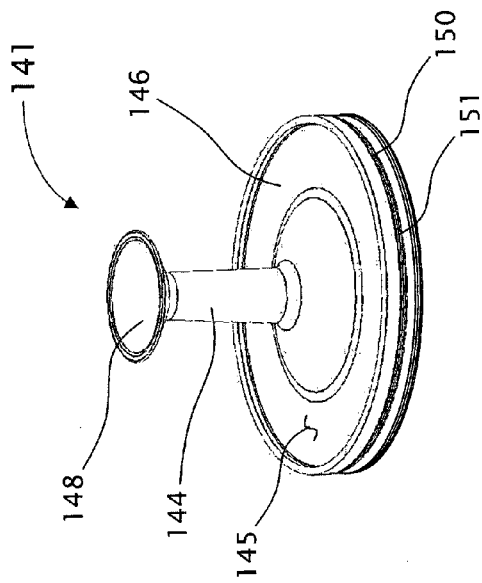
FIG. 4g is a top perspective-view illustration of an exemplary mechanism for transferring the preserving fluid from the food-items container to the liquid-holding compartment and back, wherein the fluid transfer mechanism includes two sealing rings.
Figure 4H:
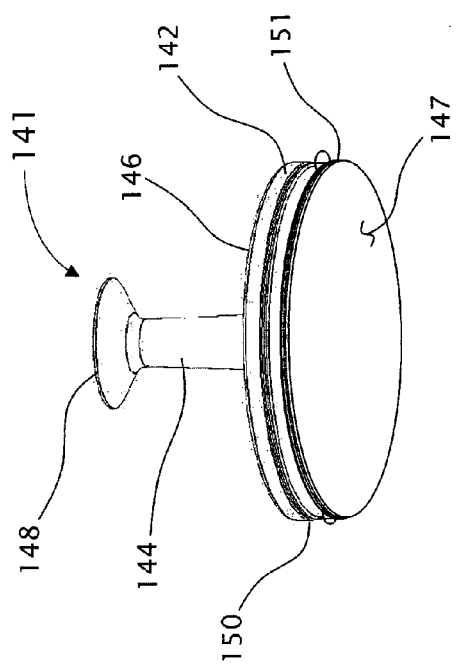
FIG. 4h is a bottom perspective-view illustration of the mechanism for transferring the preserving fluid shown in FIG. 4g.

In the examples shown in FIGS. 4a, 4b, and 5, fluid-transfer mechanism 140 includes a single sealing ring 150. FIG. 4g is a top perspective-view illustration of another exemplary mechanism 141 for transferring preserving fluid 20 from food-items container 120 to liquid-holding compartment 130 and back, wherein liquid-transfer mechanism 141 includes two sealing rings 150 and 151. FIG. 4h is a bottom perspective-view illustration of liquid-transfer mechanism 141.

It should be noted that the contour of edge 142 is preferably, with no limitations, concave and rounded to facilitate better sealing by sealing member 150. For example, the contour of edge 142 is cylindrical or elliptical.

Reference is also made to FIGS. 4c and 4d, which illustrate top and bottom perspective views, respectively, of an exemplary liquid-transfer mechanism 240 for transferring fluid 20 from dish 220 to liquid-holding compartment 230 and back, according to preferred embodiments of the present invention. Liquid-transfer mechanism 240, compared with liquid-transfer mechanism 140, includes a sealing member 250 instead of sealing member 150. Sealing member 250 includes an extended sealing surface with respect to sealing member 150, thereby providing better sealing performance and longer lifespan.

Liquid-transfer mechanism 240 further included a handle 248 securely attached to a top surface 245 of disc member 246 by a stem 244, for example. It should be noted that top surface 245 of disc member 246 may not be flat. Reference is also made to FIGS. 4e and 4f, which illustrate top and bottom exploded perspective views, respectively, of liquid-transfer mechanism 240. Disc member 246 includes a groove 243 formed between an upper ring member 241 and a bottom ring member 242 of disc member 246. A wide inner protrusion 253 of sealing member 250 is operatively disposed inside groove 243 of disc member 246, while bottom ring member 242 of disc member 246 is operatively disposed inside a groove 252 formed between inner protrusion 253 and a floor 256 of sealing member 250. Optionally, dish 220 includes a stand 222 for stabilizing serving and preserving device 200. Stand 222 and dish 220 may be made from a single piece or from multiple pieces securely attached to each other.

Reference is also made to FIG. 7—an exploded-view illustration of food-items container 220 of serving and preserving device 200. A bottom surface 257 of sealing member 250 is preferably fitted to the coupled section of a floor 226 of dish 220. Typically, bottom surface 257 is, with no limitation, substantially flat. Sealing member 250 keeps bottom surface 257 sealed with respect to top surface 245 of disc member 246, while facilitating free up and down motion of liquid-transfer mechanism 240, along inner wall 235 of liquid-holding compartment 230.

Figure 6:
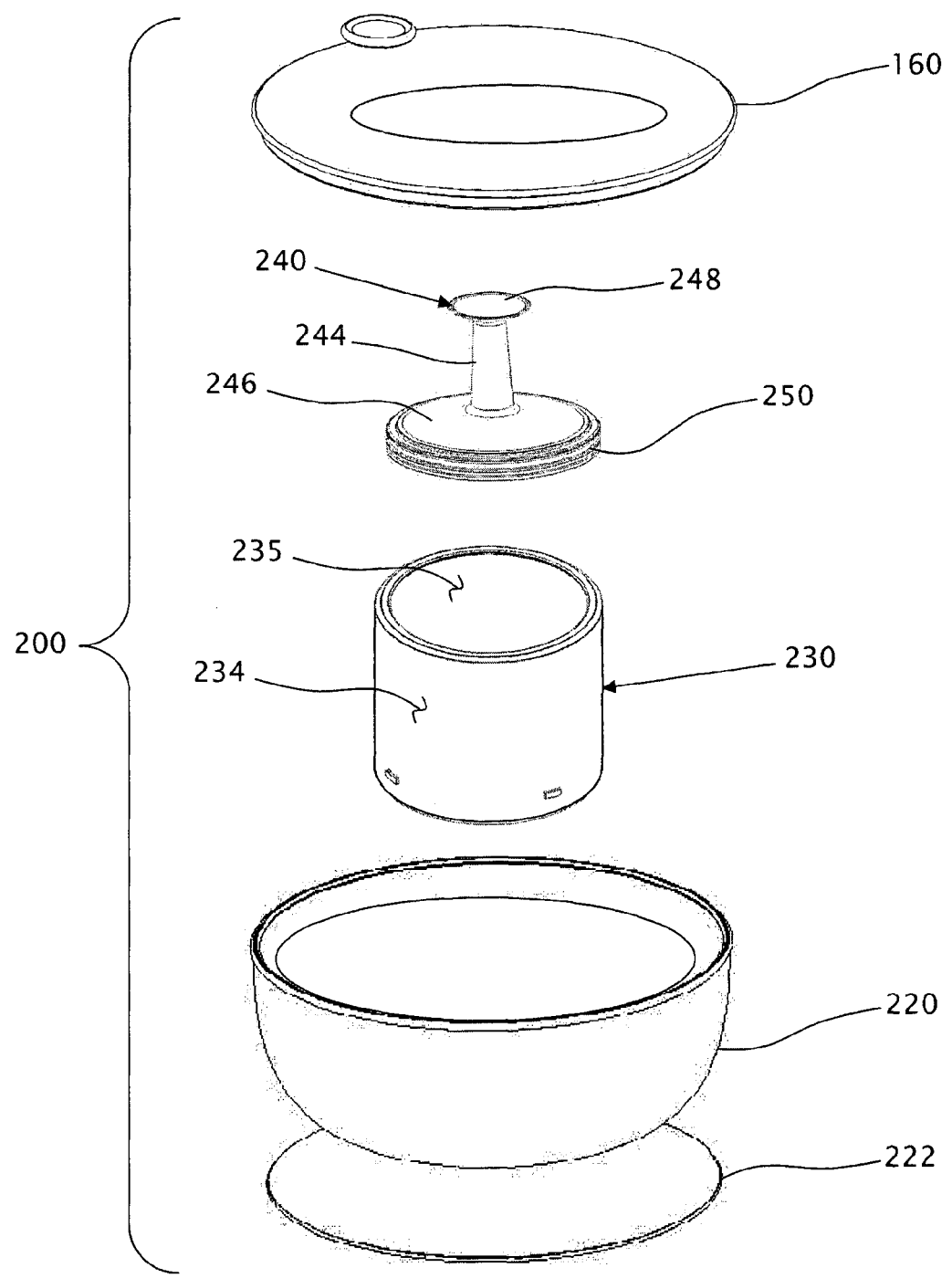
FIG. 6 is an exploded-view illustration of a serving and preserving device, according to a preferred embodiment of the present invention.

Reference is also made to FIG. 6—an exploded-view illustration of serving and preserving device 200; to FIG. 9a—a cross-section AA'-view illustration of food-items container 220, having liquid-holding compartment 230 disassembled; and to FIG. 9b—a cross-section AA'-view illustration of food-items container 220.

It should be noted that a peripheral surface 254 of sealing member 250 is concave and preferably, with no limitations, rounded to facilitate better sealing by sealing member 250. For example, the contour of edge 142 is cylindrical or elliptical.

Preferably, sealing member 250 is cylindrical to facilitate pivotal motion of liquid-holding compartment 230 with respect to dish 220.

Optionally, liquid-holding compartment 230 is detachable from dish 220 to facilitate occasional cleaning of serving and preserving device 200. Liquid-holding compartment 230 has a tubular form, having a top edge 238, a bottom edge 239, and a cylindrical external surface 234.

To facilitate the detachability of liquid-holding compartment 230 from dish 220, a lock/unlock mechanism is embodied. The lock/unlock mechanism can be any such mechanism known in the art. In the example shown in FIGS. 4c-9b, the lock/unlock mechanism includes one or more dowels 232 disposed on cylindrical external surface 234 of liquid-holding compartment 230, at or proximal to bottom edge 239. Preferably, there are two or more dowels 232 disposed on external surface 234. Reference is also made to FIG. 8, which is a detailed-view illustration of window B (shown in FIG. 7).

Dowels 232 are optionally oblong-shaped, having a narrow dimension $d_1$ and a wider dimension $d_2$, wherein $d_1=d_2$ in embodiments of the present invention. Preferably, one or more dowels 232 include a mobility-limiting projection 233 disposed at a first end of a selected dowel 232, wherein projection 233 projects toward or away from bottom edge 239.

To accommodate liquid-holding compartment 230, a cylindrical cavity is formed at the bottom section of an inner surface 224 of dish 220, including a floor 226, wherein the dimensions of the cylindrical cavity is fitted to the corresponding external dimensions of cylindrical external surface 234 of liquid-holding compartment 230. One) or more "L"-shaped grooves 223 are formed on the inner walls of the cylindrical cavity, wherein each "L"-shaped groove 223 includes an axial section, substantially parallel to an axis 231 of liquid-holding compartment 230, and a lateral section 225, substantially perpendicular to the axial section. The number of "L"-shaped grooves 223 is at least the number of respective dowels 232. The radial distance between adjacent "L"-shaped grooves 223 match the radial distance between adjacent respective dowels 232.

The axial sections of the "L"-shaped grooves 223 are wide enough to facilitate the sliding of respective dowels 232 inside the axial section of the "L"-shaped grooves 223. When assembling liquid-holding compartment 230 into the cylindrical cavity of dish 220, dowels 232 slide along the axial section of respective "L"-shaped grooves 223. By pivoting liquid-holding compartment 230 such that dowels 232 slide along a lateral section 225 of "L"-shaped grooves 223, liquid-holding compartment 230 is thereby locked into the cylindrical cavity of dish 220, preventing any axial motion of liquid-holding compartment 230 with respect to dish 220. In the locked position, bottom edge 239 of liquid-holding compartment 230 is proximal to floor 226 of dish 220.

Preferably, to operatively couple with selected dowels 232, having a projection 233, a fitted notch 221 is formed at the closed end of lateral section 225 of "L"-shaped grooves 223 at a location that corresponds to the preconfigured location of projection 233, wherein the first end of selected dowels 232 is the end that is configured to first enter lateral section 225 of "L"-shaped grooves 223. When in a locked state, projection 233 of a selected dowel 232 is disposed inside a respective fitted notch 221 of a lateral section 225 of "L"-shaped grooves 223, thereby preventing an unwanted rotation of liquid-holding compartment 230 with respect to dish 220, specifically in an opening direction. Force needs to be applied in order to rotate liquid-holding compartment 230 with respect to dish 220, in an opening direction, enabling liquid-holding compartment 230 to be detached from dish 220.

Preferably, top edge 238 includes a lateral peripheral protrusion, extending inwardly toward axis 231, serving as a stopper for liquid-transfer mechanism 240. In such a configuration, when pulling liquid-transfer mechanism 240 upwardly toward top edge 238, top edge 238 prevents liquid-transfer mechanism 240 from being pulled out of liquid-holding compartment 230. It should be noted that before mounting liquid-holding compartment 230 into the cylindrical cavity of dish 220, liquid-transfer mechanism 240 is inserted into liquid-holding compartment 230 through the opening at bottom edge 239. The lateral peripheral protrusion of top edge 238 may extend inwardly such that top edge 238 allows free axial motion of liquid-transfer mechanism 240.

It should be noted that axial grooves 227, formed in the walls of the cylindrical cavity of dish 220, facilitate the transfer of the fluid from dish 220 to liquid-holding compartment 230 and back.

Reference is now made to FIG. 10—a top perspective-view illustration of serving and preserving device 100 in a preserving state, and FIG. 11—a top perspective-view illustration of serving and preserving device 100 in a serving state.

While in a preserving state, liquid-transfer mechanism 140 (or liquid-transfer mechanism 141) is disposed substantially at the lower position such that bottom surface 147 of disc member 146 is adjacent to floor 126 (see FIG. 3) of dish 120. Food items 10 are in the cavity of dish 120 formed by space 128, immersed in fluid 20. The edges of disc member 146 and sealing member 150 block fluid 20 from entering inner space 138 of liquid-holding compartment 130 through fluid passage openings 136.

In other embodiments of the present invention in which liquid-transfer mechanism 240 is used, liquid-transfer mechanism 240 is disposed substantially at the lower position, such that bottom surface 257 of sealing member 250 is adjacent to floor 126 of dish 120 while in a preserving state.

To bring serving and preserving device 100 to a serving state, liquid-transfer mechanism 140 (or liquid-transfer mechanism 141) is pulled up such that sealing member 150 slides along inner wall 135 of liquid-holding compartment 130, thereby forming a vacuum inside the portion of inner space 138 of liquid-holding compartment 130 below bottom surface 147 of disc member 146. As liquid-transfer mechanism 140 (or liquid-transfer mechanism 141) moves upwardly with respect to liquid-holding compartment 130, fluid passage openings 136 become unblocked, and fluid 20 from inner space 138 is sucked through fluid passage openings 136 into liquid-holding compartment 130. Preferably, the dimensions of inner space 138 are preconfigured to hold substantially all of the fluid drawn from space 128 of the cavity of dish 120. Having fluid 20 drawn from space 128 of the cavity of dish 120, users can easily pick food items 10 disposed inside the cavity of dish 120.

To bring serving and preserving device 100 back to a preserving state, liquid-transfer mechanism 140 (or liquid-transfer mechanism 141) is pushed down such that sealing member 150 slides along inner wall 135 of liquid-holding compartment 130, thereby forcing fluid 20 to flow from inner space 138 of liquid-holding compartment 130 through fluid passage openings 136 into space 128 of the cavity of dish 120.

Figure 12:
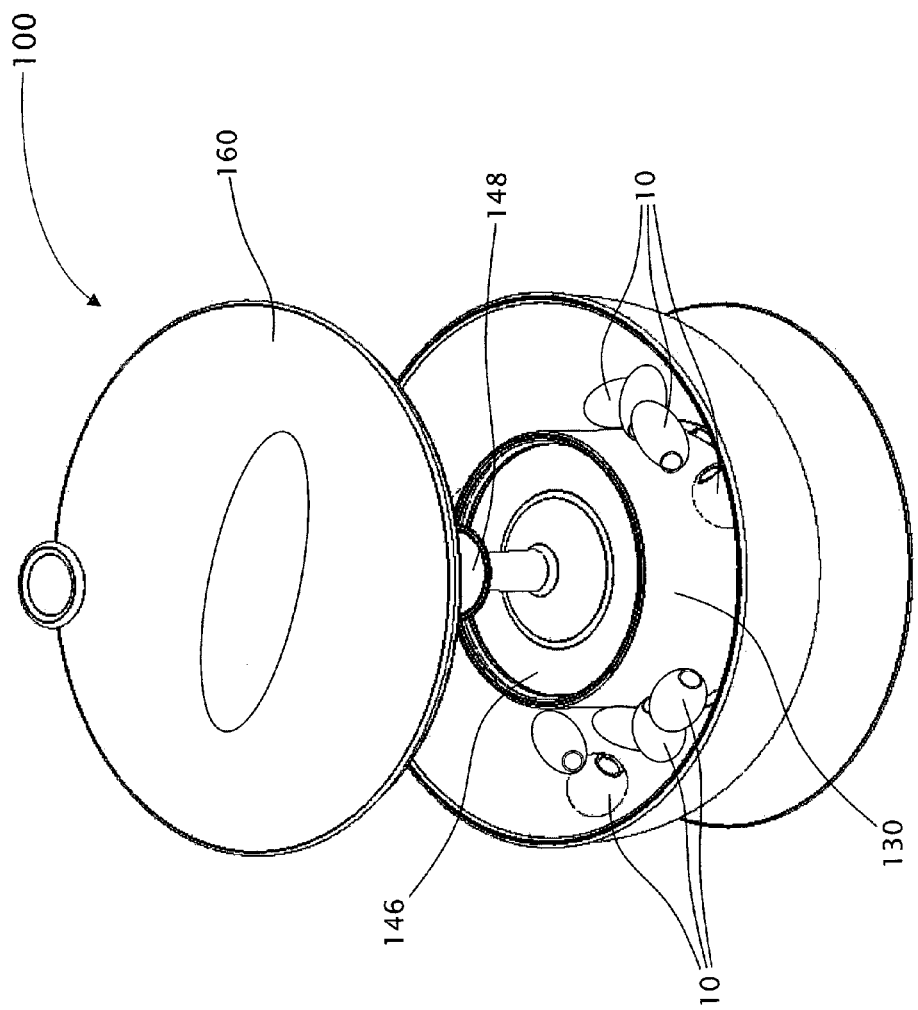
FIG. 12 is a top perspective-view illustration of the serving and preserving device shown in FIG. 1, wherein the device is in a serving state before the cover is used to push down the handle of the transferring mechanism, and thereby release the fluid back into the food-items container.

Reference is also made to FIG. 12, which is a top perspective-view illustration of serving and preserving device 100 in a serving state. Optionally, lid 160 is used to push down liquid-transferring mechanism 140 (or liquid-transferring mechanism 141), and thereby release fluid 20 back into dish 120. It should be noted that any other conventional way to push liquid-transferring mechanism 140 (or liquid-transferring mechanism 141) down is within the scope of the present invention, including by way of the user's hand.

Figure 13:
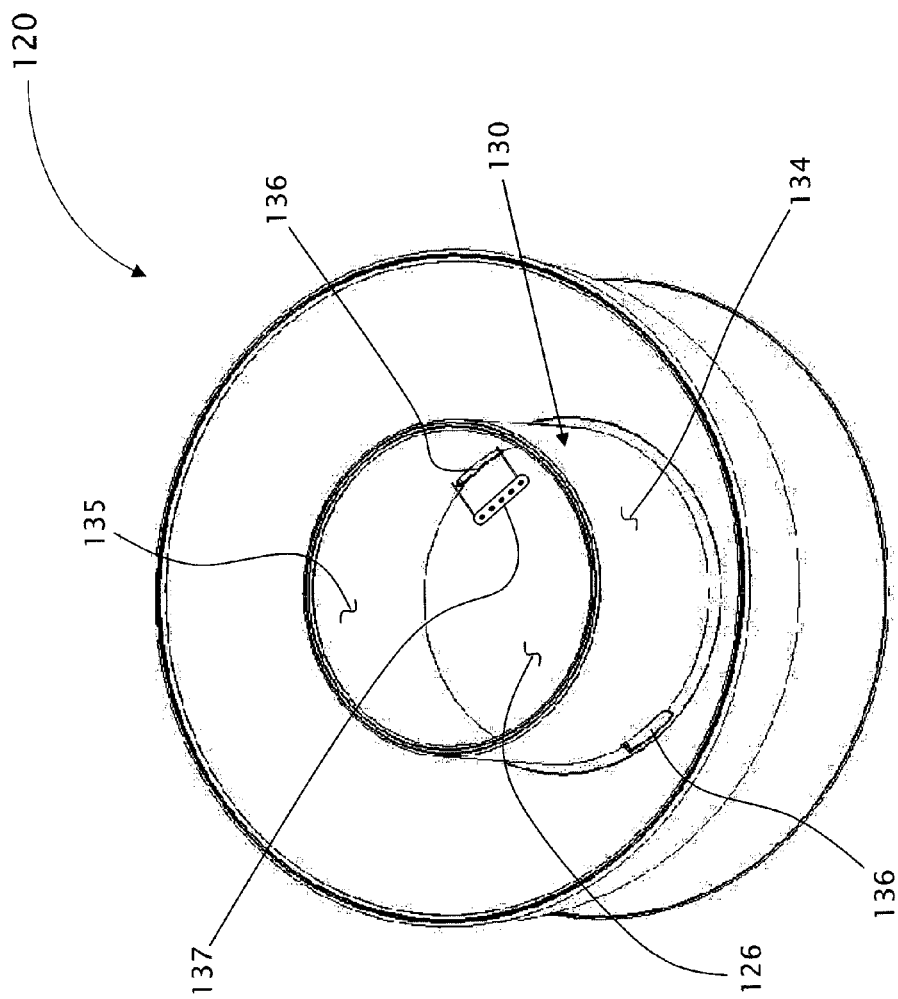
FIG. 13 is a top perspective-view illustration of an alternate embodiment of the serving and preserving device shown in FIG. 1, having a liquid-surge absorber.

Reference is made to FIG. 13, which is a top perspective-view illustration of an alternate embodiment of serving and preserving device 100, having a liquid-surge absorber 137. Liquid-surge absorber 137 prevents a surge of fluid 20 being forced to flow from inner space 138 of liquid-holding compartment 130 through fluid passage openings 136 into space 128 of the cavity of dish 120 at a force that may cause a spill of fluid 20 out of the cavity of dish 120. In other embodiment of the present invention, liquid-surge absorber 137 is disposed on the other side of a respective passage opening 136 (i.e. inside the cavity of dish 120).

In other embodiments of the present invention, liquid-surge absorber 137 serves as a filter to prevent debris from entering liquid-holding compartment 130 instead of, or in addition to, serving as a liquid-surge absorber.

In other embodiments of serving and preserving device 100 (and similarly device 200), lid 160 includes an opening formed around the center of lid 160 such that lid 160 covers space 128 of the cavity of dish 120, while allowing liquid-transfer mechanism 140 (or liquid-transfer mechanism 141) to operatively move through the opening in lid 160 without removing lid 160.

It should be noted that the generally-round shape of serving and preserving device 100 is given by way of example only, and can be formed in any shape. It should be further noted that serving and preserving device 100 can be formed in any material suitable for serving and preserving food items.

Figure 14:
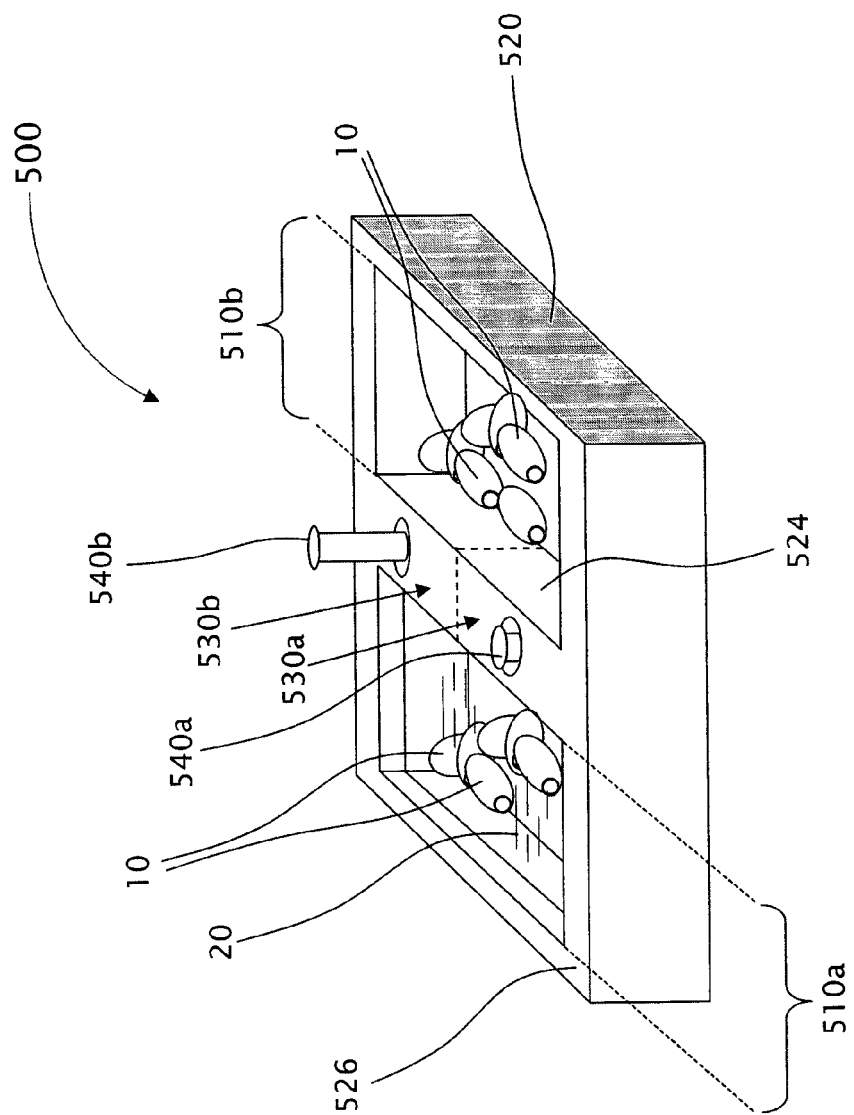
FIG. 14 is a perspective-view illustration of a rectangularly-shaped serving and preserving device, according to alternate embodiments of the present invention.

Reference is now made to FIG. 14, which is a top perspective-view illustration of a rectangularly shaped serving and preserving device 500, with no limitation on the shape, according to alternate embodiments of the present invention. Serving and preserving device 500 includes two open serving containers 510a and 510b for holding food items 10. A body 520 and a divider 524 form cavities in open serving containers 510a and 510b, wherein food items 10 are disposed inside one or more cavities, and typically immersed in preserving fluid 20. Serving container 510a is shown in a preserving state, while serving container 510b is shown in a serving state. Divider 524 between serving containers 510a and 510b includes two separate liquid-holding compartments 530 for holding preserving fluid 20 from respective serving containers 510a and 510b when in a serving state. Serving and preserving device 500 includes two respective liquid-transfer mechanisms 540a and 540b. Device 500 further includes one or more passageways (not shown) facilitating a flow of fluid 20 in and out of compartments 530a and 530b from and to respective serving containers 510a and 510b.

In other embodiments of serving and preserving device 500, a single mechanism is enabled for transferring the fluid from serving containers 510a and 510b to a single fluid-holding compartment and back.

In other embodiments of serving and preserving device 500, a single mechanism for transferring the fluid from serving containers 510a and 510b selectively draws or returns from or to a selected serving container 510a or 510b.

In other embodiments of the present invention, serving and preserving device 500 includes more than two open serving containers 510 for holding food items 10.

Figure 15:
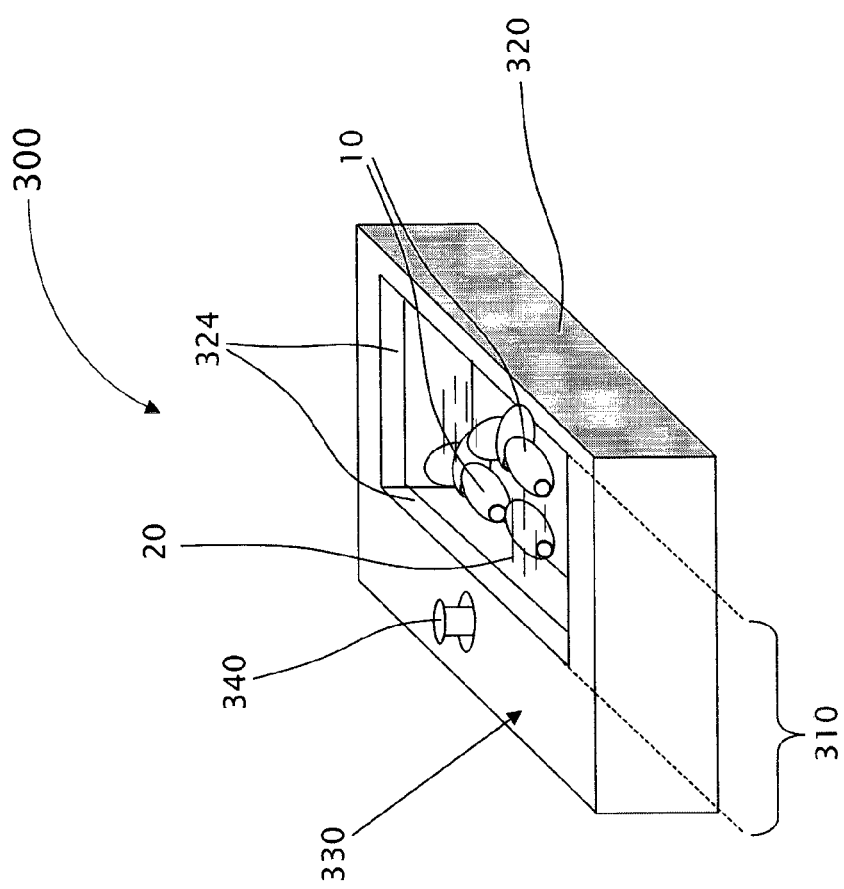
FIG. 15 is a top perspective-view illustration of another exemplary embodiment of a rectangularly-shaped serving and preserving device, according to alternate embodiments of the present invention.

Reference is now made to FIG. 15, which is a top perspective-view illustration of a rectangularly-shaped serving and preserving device 300, according to alternate embodiments of the present invention. Serving and preserving device 300 includes a body 320 and a liquid-holding compartment 330. An open serving container 310 for holding food items 10 is formed between inner walls 324 of body 320. When in use, food items 10 are disposed inside open serving container 310, and typically immersed in a preserving fluid 20. Liquid-holding compartment 330 holds preserving fluid 20 from open serving container 310 when in a serving state. Serving and preserving device 300 includes a liquid-transfer mechanism 340 and one or more passageways (not shown) facilitating a flow of fluid 20 in and out of liquid-holding compartment 330 from and to open serving container 310. In other embodiments of the present invention, liquid-transfer mechanism 340 is disposed on a side wall of liquid-holding compartment 330.

It should be noted that the generally-rectangular shape of serving and preserving devices 200 and 300 are given by way of example only and can be formed in any shape. It should be further noted that serving and preserving devices 200 and 300 can be formed in any material suitable for serving and preserving food items.

Figure 16:
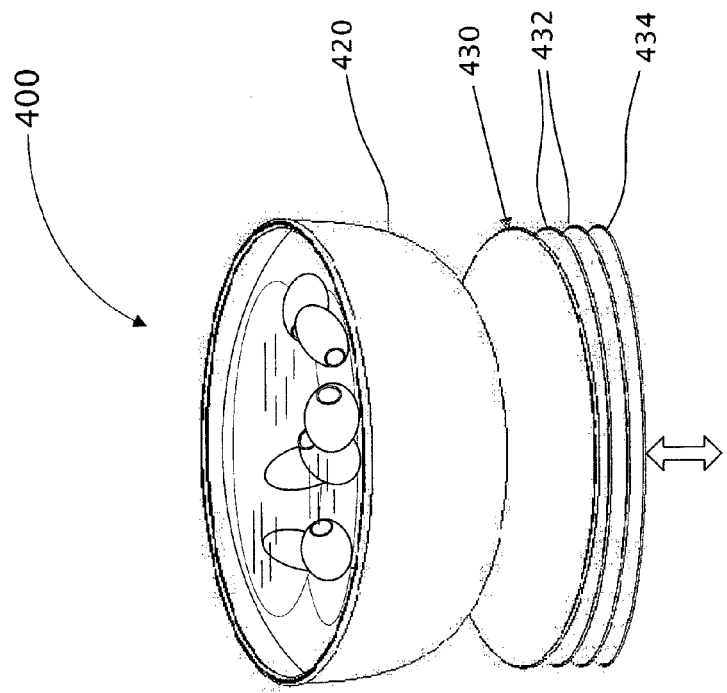
FIG. 16 is a top perspective-view illustration of a serving and preserving device having a flexible stand that also facilitates a liquid-holding compartment, wherein the device is in a preserving state, according to alternate embodiments of the present invention.
Figure 17:
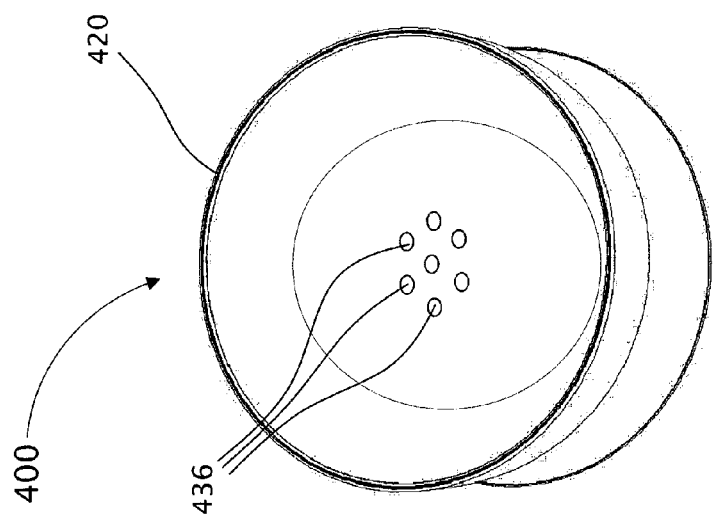
FIG. 17 is a top perspective-view illustration of the serving and preserving device shown in FIG. 16, showing the suction openings facilitating a passage for the preserving fluid to flow in and out of the liquid-holding compartment.
Figure 18:
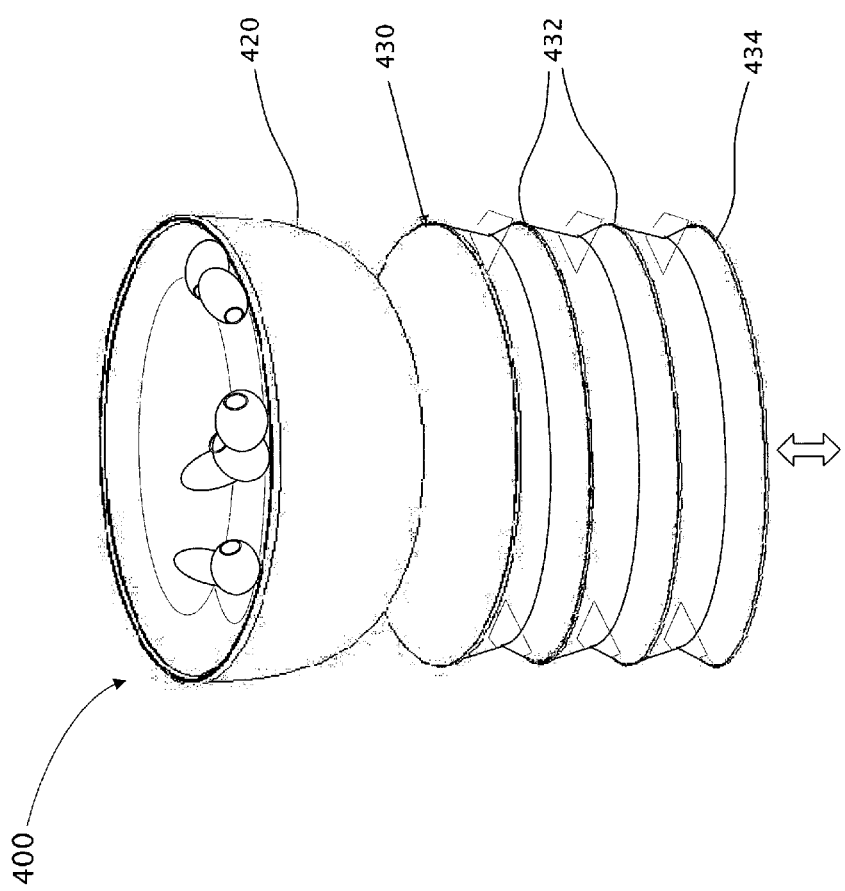
FIG. 18 is a top perspective-view illustration of the serving and preserving device shown in FIG. 16, wherein the device is in a serving state.

In another embodiment of the present invention, a serving and preserving device for serving and preserving food items 10, such as serving and preserving device 100, is provided, wherein stand 122 is replaced by a flexible stand that also facilitates a liquid-holding compartment for holding fluid 20 in a serving state. Reference is now made to FIG. 16, which is a top perspective-view illustration of a serving and preserving device 400 having a flexible stand that also facilitates a liquid-holding compartment 430 for holding fluid 20, wherein device 400 is in a preserving state, according to embodiments of the present invention. Reference is also made to FIG. 17—a top perspective-view illustration of serving and preserving device 400 showing openings 436 facilitating a passage for fluid 20 to flow in and out of compartment 430 from and to the cavity of dish 420, and FIG. 18—a top perspective-view illustration of a serving and preserving device 400 in a serving state.

Holding compartment 430 is built in a flexible and foldable structure such as an accordion-pleats structure. In the example shown in FIGS. 16-18, foldable structure 430 includes multiple layers 432 and a bottom layer 434 which also serves as a stand. Foldable structure 430 forms a hollow space enclosed with foldable structure 430, wherein the volume of the enclosed space depends on the folding position of foldable structure 430. In the example shown in FIG. 16, layers 432 are depressed against each other, thereby reducing the volume of the enclosed space to a minimum, proximal to zero. In the example shown in FIG. 18, layers 432 are pulled apart, thereby increasing the volume of the enclosed space, while forming a vacuum force inside foldable structure 430. The vacuum force sucks in preserving fluid 20 from inside the cavity of dish 420 through openings 436, bringing device 400 to a serving state.

It should be noted that the generally-round shape of serving and preserving device 400 is given by way of example only, and can be formed in any shape. It should be further noted that serving and preserving device 400 can be formed in any material suitable for serving and preserving food items.

In other embodiments of the present invention, the walls of dish 120 and/or body 220 of serving and preserving devices 100 and/or 200, respectively, are double walls, forming an enclosed space between the walls, the space serving as the liquid-holding compartment for fluid 20 instead of liquid-holding compartment 130.

In other embodiments of the present invention, the mechanism for transferring the fluid from the dish to the fluid-holding compartment (and back) is a pump (e.g. an electric pump).

Figure 19:
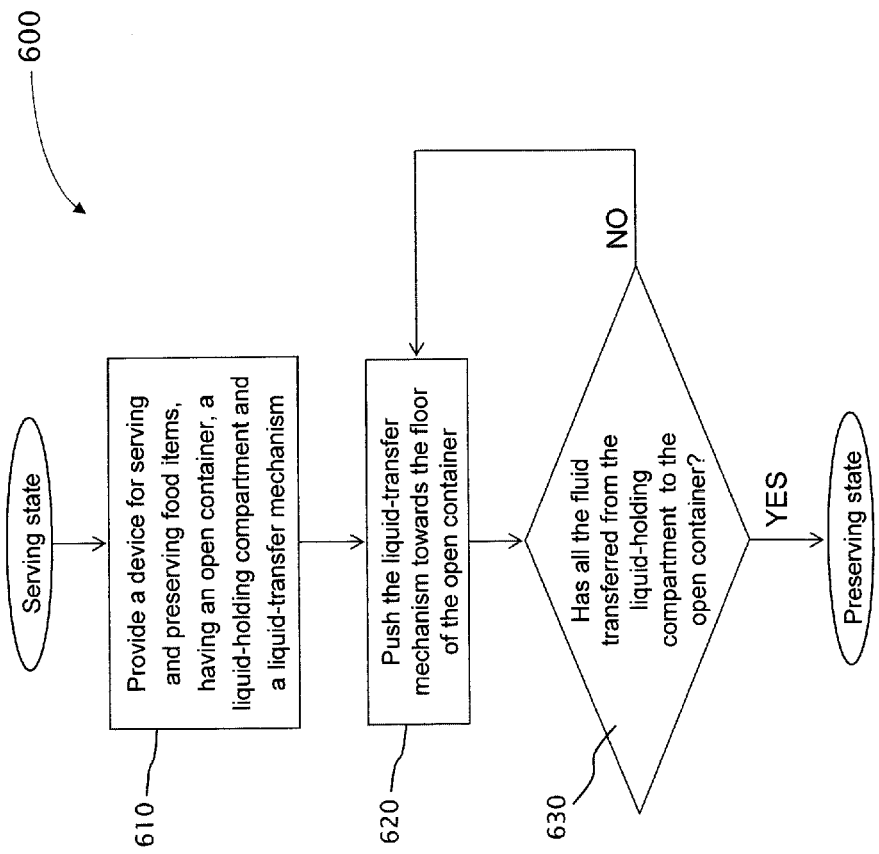
FIG. 19 is a simplified flowchart of the major operational steps for switching a device for serving and preserving food items from a serving state to a preserving state, according to embodiment of the present invention.

An aspect of the present invention is to provide a method for switching a device (100, 200, 300, 400, or 500) for serving and preserving food items from a serving state to a preserving state. Reference is now made to FIG. 19, which is a simplified flowchart of a method 600 for switching a device for serving and preserving food items from a serving state to a preserving state, according to embodiments of the present invention.

Method 600 starts with providing a device (100, 200, 300, 400 or 500) for serving and preserving food items 10 (Step 610), and pushing the handle toward the floor of the open container (Step 620), thereby transferring fluid 20 from the liquid-holding compartment to the open container. Optionally, the pushing of the handle toward the floor of the open container is performed while enclosing the open mouth of the open container by the lid. Once all the fluid has transferred from the liquid-holding compartment to the open container (Step 630), the device is in a preserving state.

An aspect of the present invention is to provide a method for switching a device (100, 200, 300, 400, or 500) for serving and preserving food items from a preserving state to a serving state. Reference is now made to FIG. 20, which is a simplified flowchart of a method 700 for switching a device for serving and preserving food items from a preserving state to a serving state, according to embodiments of the present invention.

Method 700 starts with providing a device (100, 200, 300, 400 or 500) for serving and preserving food items 10 (Step 710), and pulling the handle toward the top edge of the liquid-holding compartment and away from the floor of the open container (Step 720), thereby forming a vacuum inside the liquid-holding compartment, resulting in fluid 20 transferring from the open container to the liquid-holding compartment. Once all the fluid has transferred from the open container to the liquid-holding compartment (Step 730), the device is in a serving state.

The present invention being thus described in terms of several embodiments and examples, it will be appreciated that the same may be varied in many ways. Such variations are not to be regarded as a departure from the spirit and scope of the invention, and all such modifications as would be obvious to one skilled in the art are contemplated.

What is claimed is:

1. A device for holding, serving and preserving non-liquid food items, the device comprising:
    an open container, having one or more side walls and a floor, for holding the food items, wherein the device is adapted to be in an immersed state when the food items are immersed in fluid;
    a liquid-holding compartment, having a tubular form and a cylindrical configuration, for holding said fluid when the device is in a non-immersed state; and
    a liquid-transfer mechanism for bidirectionally transferring said fluid between said open container and said liquid-holding compartment, while said non-liquid food items remain in said open container;
wherein one or more passageways, interconnecting said open container and said liquid-holding compartment, facilitate said transfer of fluid between said open container and said liquid-holding compartment, in both directions, back and forth, as well as holding said fluid in either said open container or said liquid-holding compartment, wherein said liquid-holding compartment includes an inner wall, an outer wall, a bottom edge disposed adjacent or proximal to said floor of said open container, and a top edge, wherein said one or more passageways are formed at or proximal to said bottom edge, facilitating the transfer of substantially all of said fluid to either said open container or said liquid-holding compartment;
wherein said liquid-holding compartment is detachable from said open container, and
wherein said liquid-holding compartment is operatively attached to said open container by a lock/unlock mechanism; and
wherein said lock/unlock mechanism includes:
    one or more dowels, having a width and a height, disposed on the cylindrical external surface of said liquid-holding compartment, at or proximal to said bottom edge; and
    one or more "L"-shaped grooves formed on the inner walls of a cylindrical cavity, wherein said cylindrical cavity is formed at the bottom of the inner surface of said open container;
wherein each of said "L"-shaped grooves includes an axial section, substantially parallel to the longitudinal axis of said liquid-holding compartment, and a lateral section, substantially perpendicular to said axial section;
wherein the number of said "L"-shaped grooves is at least the number of said one or more dowels;
wherein the radial distance between adjacent "L"-shaped grooves match the radial distance between adjacent respective dowels;
wherein said axial sections of said "L"-shaped grooves are wider than said width of said respective dowels, thereby facilitating the sliding of said dowels inside said axial section of said respective "L"-shaped grooves; and
wherein the height of said lateral section of said "L"-shaped grooves is slightly higher than said height of said respective dowels, thereby facilitating the sliding of said dowels inside said lateral section of said respective "L"-shaped grooves.

2. The device of claim 1, wherein said liquid-holding compartment is securely attached to said open container.

3. The device of claim 1, wherein said dowels further include a mobility-limiting projection disposed at a first end of selected dowels, wherein said projection projects toward or away from said bottom edge of said liquid-holding compartment;
    wherein said lateral sections of said "L"-shaped grooves include a fitted notch, formed at the closed end of said lateral section, at a location that corresponds to a pre-configured location of said projection;
    wherein said first end of said selected dowels is the end that is configured to first enter said lateral section of said "L"-shaped grooves; and
    wherein when in a locked state, said projection of said selected dowels is disposed inside a respective fitted notch of said lateral section of said "L"-shaped grooves.

4. The device of claim 1, wherein said liquid-transfer mechanism includes:
    a. disc member having a top surface, a bottom surface, and a peripheral edge;
    b. at least one sealing member; and
    c. a handle,
wherein said handle is securely attached to said top surface of said disc member;
wherein a peripheral contour of said peripheral edge of said disc member is fitted to the contour of said inner wall of said liquid-holding compartment; and
wherein said sealing member is operatively disposed on said peripheral contour of said disc member.

5. The device of claim 4, wherein said liquid-transfer mechanism is operatively disposed inside said liquid-holding compartment, and wherein said sealing member substantially seals said top surface of said disc member from said bottom surface of said disc member.

6. The device of claim 1, wherein said liquid-transfer mechanism is disposed inside said liquid-holding compartment adjacent to said floor of said open container when the device is in said preserving state, thereby said fluid is sustained inside said open container.

7. The device of claim 1, wherein said liquid-transfer mechanism is disposed inside said liquid-holding compartment adjacent to said top edge of said liquid-holding compartment when the device is in said serving state, thereby said fluid is sustained inside said liquid-holding compartment.

8. The device of claim 1, wherein said liquid-transfer mechanism is pulled up toward said top edge of said liquid-holding compartment, and away from said floor of said open container in order to switch the device from said preserving state to said serving state, thereby forming a vacuum inside said liquid-holding compartment, and thereby sucking said fluid from said open container into said liquid-holding compartment through said one or more passageways.

9. The device of claim 1, wherein said liquid-transfer mechanism is pushed down toward said floor of said open container in order to switch the device from said serving state to said preserving state, thereby pushing said fluid from said open container into said liquid-holding compartment through said one or more passageways.

10. The device of claim 1, wherein a surge absorber is disposed at or proximal to one or more of said passageways, said surge absorber is adapted to prevent a surge of said fluid from said liquid-holding compartment into said open container.

11. The device of claim 1, wherein a filter is disposed at or proximal to one or more of said passageways, said filter is adapted to prevent debris from entering said liquid-holding compartment.

12. The device of claim 1 the device further comprising one or more additional open containers, thereby facilitating serving multiple types of food items.

13. The device of claim 12, wherein each of said additional open containers is operatively coupled with a respective additional liquid-holding compartment.

14. The device of claim 1, wherein said liquid-holding compartment shares at least one mutual wall with said open container; and wherein said one or more passageways are formed at a preconfigured location in said at least one mutual wall.

15. The device of claim 14, wherein said at least one mutual wall is one or more of said side walls of said open container; and wherein said preconfigured location is proximal to the bottom section of said at least one mutual wall.

\* \* \* \* \*